United States Patent
Suzuki et al.

(10) Patent No.: US 7,280,446 B2
(45) Date of Patent: Oct. 9, 2007

(54) OPTICAL DISK DRIVE RESPONSIVE TO INTERNAL TEMPERATURE CHANGE

(75) Inventors: Yoshihisa Suzuki, Bisai (JP); Sayoko Tanaka, Anpachi-gun (JP); Hitoshi Noguchi, Gifu (JP); Hiroki Ishida, Gifu (JP)

(73) Assignee: Sanyo Electric Co., Ltd., Moriguchi-shi (JP)

( * ) Notice: Subject to any disclaimer, the term of this patent is extended or adjusted under 35 U.S.C. 154(b) by 1126 days.

(21) Appl. No.: 09/964,874

(22) Filed: Sep. 28, 2001

(65) Prior Publication Data

US 2002/0048237 A1    Apr. 25, 2002

(30) Foreign Application Priority Data

Sep. 29, 2000   (JP) ............... 2000-299750

(51) Int. Cl.
    *G11B 7/00*    (2006.01)
(52) U.S. Cl. ................. 369/44.29; 369/53.18
(58) Field of Classification Search ............ 369/53.18, 369/44.29; *G11B 7/00*
    See application file for complete search history.

(56) References Cited

U.S. PATENT DOCUMENTS

| | | | | |
|---|---|---|---|---|
| 4,507,767 | A * | 3/1985 | Takasugi | 369/53.26 |
| 5,276,697 | A * | 1/1994 | Davis | 372/38.07 |
| 5,532,991 | A * | 7/1996 | Sasaki | 369/44.35 |
| 5,566,077 | A * | 10/1996 | Kulakowski et al. | 700/299 |
| 5,699,333 | A * | 12/1997 | Tsutsui | 369/44.29 |
| 5,852,596 | A * | 12/1998 | Kurita et al. | 369/53.18 |
| 6,064,534 | A * | 5/2000 | Simozato | 360/46 |
| 6,115,338 | A * | 9/2000 | Masaki et al. | 369/47.52 |
| 6,169,930 | B1 * | 1/2001 | Blachek et al. | 700/79 |
| 6,259,466 | B1 * | 7/2001 | Oomura et al. | 347/237 |
| 6,494,370 | B1 * | 12/2002 | Sanchez | 235/454 |
| 6,567,350 | B1 * | 5/2003 | Takagi et al. | 369/30.23 |

FOREIGN PATENT DOCUMENTS

| | | |
|---|---|---|
| JP | 02-031341 | 2/1990 |
| JP | 03-066031 | 3/1991 |
| JP | 04-283435 | 10/1992 |
| JP | 08-306052 | * 11/1996 |
| JP | 09-102147 | 4/1997 |
| JP | 10-283645 | * 10/1998 |
| JP | 11-134663 | 5/1999 |
| JP | 2000-2361888 | * 8/2000 |

OTHER PUBLICATIONS

MAT (machine assisted translation) of JP 2000-236188.*
MAT (machine assisted translation) of JP 10-283645.*
MAT (Machine assited translation) of JP 08-306052.*

* cited by examiner

*Primary Examiner*—A M Psitos
(74) *Attorney, Agent, or Firm*—Westerman, Hattori, Daniels & Adrian, LLP.

(57) ABSTRACT

There is provided an optical disk drive capable of appropriately effecting recording and reproducing operations without being affected by offset values and a laser output value, which are set at startup of the disk drive, even when changes have arisen in the internal temperature of the disk drive because of changes in ambient temperature. In an optical disk drive, a temperature sensor provided on a pickup measures a temperature. When changes in temperature are greater than a predetermined level, a focus offset value, a tracking offset value, and a value of laser output from the pickup are reset.

6 Claims, 7 Drawing Sheets

OPTICAL DISK DRIVE RESPONSIVE TO INTERNAL TEMPERATURE CHANGE

BACKGROUND OF THE INVENTION

1. Field of the Invention

The present invention relates to an optical disk drive which records data on and reproduces data from an optical disk, such as a magneto-optical disk. Particularly, the present invention relates to a focus offset, a tracking offset, and control of a laser output value.

2. Description of the Related Art

There has hitherto been known an optical disk drive which records data on and reproduces data from an optical disk, such as a magneto-optical disk, and an optical disk drive of play-only type. Such an optical disk drive effects focus and tracking control operations. During the focus and tracking control operations, offset adjustment is performed for compensating for individual characteristics of an optical disk drive or for making the optical disk drive compliant with conditions of use. More specifically, a focus offset and a tracking offset are adjusted.

Offset adjustment is performed only once at startup of an optical disk drive; that is, when an optical disk is loaded into the optical disk drive. In relation to a focus offset, at the time of startup of the optical disk drive, an offset value is set to a value at which an RF signal is maximized. In relation to a tracking offset, at the time of startup of the optical disk drive, an offset value is set to a value at which a tracking error signal obtained in an on-track state comes to the center of a tracking error signal obtained in an off-track state. Focus and tracking control operations are performed while the thus-set offset values are taken as references until the optical disk is unloaded from the disk drive.

Further, an output value of laser emitted from a pickup is set also at the time of startup of the optical disk drive. More specifically, the laser output value is set such that a data error rate is minimized.

The related-art optical disk drive sets a focus offset, a tracking offset, and a laser output value only at startup. Hence, if changes have arisen in the internal temperature of an optical disk drive because of changes in the ambient temperature of the optical disk drive or those in the temperature of a board provided in the optical disk drive or the like, changes will arise in an offset characteristic of a circuit or in an optical property of a pickup. As a result, the set offset values and the laser output value will deviate from optimal values. Particularly in the case of a portable optical disk drive, set offset values and laser output values may greatly deviate from optimal values when the optical disk drive is transported from indoors to outdoors.

For example, in relation to a focus offset, a relationship between a focus offset value and an error rate at 25° is different from that at 65°, as shown in FIG. 6. Further, in relation to a tracking offset, a relationship between a tracking offset value and an error rate at 25° is different from that at 65°, as shown in FIG. 7. Optimal offset values change in accordance with temperatures. If offset values deviate from appropriate values, recording and reproducing operations may fail to be performed properly.

SUMMARY OF THE INVENTION

The present invention is aimed at providing an optical disk drive capable of appropriately effecting recording and reproducing operations without being affected by offset values and a laser output value, which are set at startup of the disk drive, even when changes have arisen in the internal temperature of the disk drive in response to changes in ambient temperature.

The present invention provides an optical disk drive comprising:

temperature measurement means for measuring an internal temperature of the optical disk drive; and resetting means which resets offset values and/or a laser output value in accordance with changes in the temperature measured by the temperature measurement means.

In the optical disk drive, the temperature measurement means measures the internal temperature of the optical disk drive. The resetting means resets offset values and/or a laser output value in accordance with changes in the temperature measured by the temperature measurement means. Hence, when great changes have arisen in temperature, offset values and laser output value which are optimal for the thus-changed temperature can be set, thereby enabling appropriate recording and reproducing operation.

Preferably, the offset values include a focus offset value and/or a tracking offset value. Hence, even when great changes have arisen in temperature, a focal offset value and a laser output value can be made optimal.

The present invention also provides an optical disk drive comprising:

temperature measurement means for measuring an internal temperature of the optical disk drive;

determination means for determining whether or not the level of change in the temperature measured by the temperature measurement means has exceeded a predetermined level; and offset value resetting means which resets a focus offset value and/or a tracking offset value when the determination means determines that the level of change in temperature has exceeded a predetermined level.

In this optical disk drive, the temperature measurement means measures the internal temperature of the optical disk drive. The determination means determines whether or not the level of change in the temperature measured by the temperature measurement means has exceeded a predetermined level. The offset value resetting means resets a focus offset value and/or a tracking offset value when the determination means determines that the level of change in temperature has exceeded a predetermined level. Hence, when great changes have arisen in temperature, offset values optimal for the thus-changed temperature can be set, thereby enabling appropriate recording and reproducing operation.

The present invention also provides an optical disk drive comprising:

temperature measurement means for measuring an internal temperature of the optical disk drive;

determination means for determining whether or not the level of change in the temperature measured by the temperature measurement means has exceeded a predetermined level;

offset value resetting means which resets a focus offset value and/or a tracking offset value when the determination means determines that the level of change in temperature has exceeded a predetermined level; and laser output resetting means which resets a laser output value of a light-emitting section, the laser being output from the light-emitting section for recording and/or reproducing data on and/or from an optical disk, when the determination means determines that the level of temperature change has exceeded a predetermined level.

In this optical disk drive, the temperature measurement means measures an internal temperature of the optical disk drive. The determination means determines whether or not the level of change in the temperature measured by the temperature measurement means has exceeded a predetermined level. The offset value resetting means resets a focus offset value and/or a tracking offset-value when the determination means determines that the level of change in temperature has exceeded a predetermined level. The laser output resetting means resets a laser output value of a light-emitting section, the laser being output from the light-emitting section for recording and/or reproducing data on and/or from an optical disk, when the determination means determines that the level of temperature change has exceeded a predetermined level. Hence, when great changes have arisen in temperature, a laser output value optimal for the thus-changed temperature can be set, thereby enabling appropriate recording and reproducing operation.

The present invention provides an optical disk drive comprising:

temperature measurement means for measuring an internal temperature of the optical disk drive;

determination means for determining whether or not the level of change in the temperature measured by the temperature measurement means has exceeded a predetermined level; and laser output resetting means which resets a laser output value of a light-emitting section, the laser being output from the light-emitting section for recording and/or reproducing data on and/or from an optical disk, when the determination means determines that the level of temperature change has exceeded a predetermined level.

In this optical disk drive, the temperature measurement means measures an internal temperature of the optical disk drive. The determination means determines whether or not the level of change in the temperature measured by the temperature measurement means has exceeded a predetermined level. The laser output resetting means resets a laser output value of a light-emitting section, the laser being output from the light-emitting section for recording and/or reproducing data on and/or from an optical disk, when the determination means determines that the level of temperature change has exceeded a predetermined level. Hence, when great changes have arisen in temperature, the laser output value optimal for the thus-changed temperature can be set, thereby enabling appropriate recording and reproducing operation.

The present invention provides an optical disk drive comprising:

setting means for setting a focus offset value and/or a tracking offset value at startup of the optical disk drive;

first temperature measurement means for measuring an internal temperature of the optical disk drive at startup of the optical disk drive;

second temperature measurement means for measuring an internal temperature the optical disk drive after startup of the optical disk drive;

determination means for determining whether or not a difference between the temperature measured by the second temperature measurement means and the temperature measured by the first temperature measurement means has exceeded a predetermined level; and resetting means for resetting the focus offset value and/or the tracking offset value set by the setting means when the determination means determines that the difference has exceeded the predetermined level.

In this optical disk drive, the setting means sets a focus offset value and/or a tracking offset value at startup of the optical disk drive. The first temperature measurement means measures an internal temperature of the optical disk drive at startup of the optical disk drive. The second temperature measurement means measures an internal temperature the optical disk drive after startup of the optical disk drive. The determination means determines whether or not a difference between the temperature measured by the second temperature measurement means and the temperature measured by the first temperature measurement means has exceeded a predetermined level. The resetting means resets the focus offset value and/or the tracking offset value set by the setting means when the determination means determines that the difference has exceeded the predetermined level. Hence, when temperature change has become greater than that at startup of the optical disk, offset values optimal for the thus-changed temperature can be set, thereby enabling appropriate recording and reproducing operation.

Preferably, the second temperature measurement means measures a temperature at predetermined times;

the determination means determines whether or not a difference between a temperature most recently measured by the second temperature measurement means and an immediately preceding temperature measured by the second temperature measurement means has exceeded a predetermined level; and resetting means resets a set focusing offset value and/or a set tracking offset value when the determination means determines that the difference has exceeded the predetermined level.

The present invention also provides an optical disk drive comprising:

setting means for setting a value laser output value of a light-emitting section, the laser being output from the light-emitting section for recording and/or reproducing data on and/or from an optical disk, at startup of the optical disk drive;

first temperature measurement means for measuring an internal temperature of the optical disk drive at startup thereof;

second temperature measurement means for measuring an internal temperature of the optical disk drive after startup thereof;

determination means for determining whether or not a difference between the temperature measured by the second temperature measurement means and the temperature measured by the first temperature measurement means has exceeded a predetermined level; and resetting means for resetting the laser output value set by the setting means when the determination means determines that the difference has exceeded the predetermined level.

In this optical disk drive, the setting means sets a value of laser output from a light-emitting section for emitting laser for use in recording and/or reproducing data on and/or from an optical disk at startup of the optical disk drive. The first temperature measurement means measures an internal temperature of the optical disk drive at startup thereof. Subsequently, the second temperature measurement means measures an internal temperature of the optical disk drive after startup thereof. The determination means determines whether or not a difference between the temperature measured by the second temperature measurement means and the temperature measured by the first temperature measurement means has exceeded a predetermined level. The resetting means resets the laser output value set by the setting means when the determination means determines that the difference has exceeded the predetermined level. Hence, when temperature change has become greater than that at startup of the optical disk, the laser output value optimal for the thus-changed temperature can be set, thereby enabling appropriate recording and reproducing operation.

Preferably, the second temperature measurement means measures a temperature at a predetermined time;

the determination means determines whether or not a difference between a temperature most recently measured by the second temperature measurement means and an immediately preceding temperature measured by the second temperature measurement means has exceeded a predetermined level; and the resetting means resets a set laser output value when the determination means determines that the difference has exceeded the predetermined level.

The present invention also provides an optical disk drive comprising:

a temperature sensor for sensing an internal temperature of the optical disk drive; and a controller for resetting offset values and/or a laser output value in accordance with changes in the temperature detected by the temperature sensor.

In this optical disk drive, the temperature sensor senses an internal temperature of the optical disk drive. The controller resets offset values and/or a laser output value in accordance with changes in the temperature detected by the temperature sensor. Hence, when great changes have arisen in temperature, offset values and the laser output value which are optimal for the thus-changed temperature can be set, thereby enabling appropriate recording and reproducing operation.

Particularly preferably, the offset values include a focus offset value and/or a tracking offset value. Hence, when great changes have arisen in temperature, a focus offset value and/or a tracking offset value which are optimal for the thus-changed temperature can be set, thereby enabling appropriate recording and reproducing operation.

The present invention also provides an optical disk drive comprising:

a temperature sensor for sensing an internal temperature of the optical disk drive; and a controller for resetting off set values and/or a laser output value in accordance with changes in the temperature detected by the temperature sensor, wherein the controller determines whether or not the level of change in the temperature measured by the temperature sensor has exceeded a predetermined level and resets a focus offset value and/or a tracking offset value when the level of temperature change is determined to have exceeded the predetermined level.

In this optical disk drive, the temperature sensor senses an internal temperature of the optical disk drive. Further, the controller determines whether or not the level of change in the temperature measured by the temperature sensor has exceeded a predetermined level and resets a focus offset value and/or a tracking offset value when the level of temperature change is determined to have exceeded the predetermined level. Hence, when great changes have arisen in temperature, offset values optimal for the thus-changed temperature can be set, thereby enabling appropriate recording and reproducing operation.

The present invention provides an optical disk drive comprising:

a temperature sensor for sensing an internal temperature of the optical disk drive, and a controller for setting a focus offset value and/or a tracking offset value and setting a laser output value of a light-emitting section, the laser being output from the light-emitting section for recording and/or reproducing data on and/or from an optical disk, wherein the controller determines whether or not the level of change in the temperature measured by the temperature sensor has exceeded a predetermined level and resets the focus offset value and/or the tracking offset value and the laser output value when the level of temperature change is determined to have exceeded the predetermined level.

In this optical disk drive, the temperature sensor senses an internal temperature of the optical disk drive. Further, the controller determines whether or not the level of change in the temperature measured by the temperature sensor has exceeded a predetermined level, and resets the focus offset value and/or the tracking offset value and the laser output value when the level of temperature change is determined to have exceeded the predetermined level. Hence, when great changes have arisen in temperature, offset values optimal for the thus-changed temperature can be set, thereby enabling appropriate recording and reproducing operation.

The present invention also provides an optical disk drive comprising:

a temperature sensor for sensing an internal temperature of the optical disk drive; and a controller for setting a laser output value of a light-emitting section, the laser being output from the light-emitting section for recording and/or reproducing data on and/or from an optical disk, wherein the controller determines whether or not the level of change in the temperature measured by the temperature sensor has exceeded a predetermined level and resets the laser output value when the level of temperature change is determined to have exceeded the predetermined level.

In this optical disk drive, the temperature sensor senses an internal temperature of the optical disk drive. Further, the controller determines whether or not the level of change in the temperature measured by the temperature sensor has exceeded a predetermined level and resets the laser output value when the level of temperature change is determined to have exceeded the predetermined level. Hence, when great changes have arisen in temperature, the laser output value optimal for the thus-changed temperature can be set, thereby enabling appropriate recording and reproducing operation.

The present invention also provides an optical disk drive comprising:

a temperature sensor for sensing an internal temperature of the optical disk drive; and a controller for setting a focus offset value and/or a tracking offset value, wherein the controller sets a focus offset value and/or tracking offset value at startup of the optical disk drive, determines whether or not a difference between a temperature measured by the temperature sensor at startup of the optical disk drive and a temperature measured by the temperature sensor after startup of the optical disk drive has exceeded a predetermined level, and resets the focus offset value and/or the tracking offset value when the difference is determined to have exceeded the predetermined level.

In this optical disk drive, the controller sets a focus offset value and/or a tracking offset value at startup of the optical disk drive. The temperature sensor senses an internal temperature of the optical disk drive, and the controller determines whether or not a difference between a temperature measured by the temperature sensor at startup of the optical disk drive and a temperature measured by the temperature sensor after startup of the optical disk drive has exceeded a predetermined level. When the difference is determined to have exceeded the predetermined level through determination, the temperature sensor resets the focus offset value and/or the tracking offset value. Hence, when temperature change has become greater than that at startup of the optical disk, offset values optimal for the thus-changed temperature can be set, thereby enabling appropriate recording and reproducing operation.

Preferably, the controller measures the temperature detected by the temperature sensor at given times, determines whether or not a difference between a most-recently measured temperature and a measured temperature preceding the most-recently measured temperature has exceeded a predetermined level, and resets set a set focusing offset value and/or a set tracking offset value when the difference is determined to have exceeded a predetermined value. Hence, when temperature change has become greater during operation of the optical disk drive after startup, offset values optimal for the thus-changed temperature can be set, thereby enabling appropriate recording and reproducing operation.

The present invention also provides an optical disk drive, comprising:

a temperature sensor for sensing an internal temperature of the optical disk drive; and a controller for setting a laser output value of a light-emitting section, the laser being output from the light-emitting section for recording and/or reproducing data on and/or from an optical disk, wherein the controller sets the laser output value at startup of the optical disk drive, determines whether or not a difference between a temperature measured by the temperature sensor at startup of the optical disk drive and a temperature measured by the temperature sensor after startup of the optical disk drive has exceeded a predetermined level, and resets the laser output value when the difference is determined to have exceeded the predetermined level.

In this optical disk drive, the controller sets a laser output value at startup of the optical disk drive. The temperature sensor senses the internal temperature of the optical disk drive and determines whether or not a difference between a temperature measured by the temperature sensor at startup of the optical disk drive and a temperature measured by the temperature sensor after startup of the optical disk drive has exceeded a predetermined level. When the difference is determined to have exceeded the predetermined level through determination, the temperature sensor resets the laser output value. Hence, when temperature change has become greater than that at startup of the optical disk, a laser output value optimal for the thus-changed temperature can be set, thereby enabling appropriate recording and reproducing operation.

Particularly preferably, the controller measures the temperature detected by the temperature sensor at given times, determines whether or not a difference between a most-recently measured temperature and a measured temperature preceding the most-recently measured temperature has exceeded a predetermined level, and resets a set laser output value when the difference is determined to have exceeded a predetermined value. Hence, when temperature change has become greater during operation of the optical disk drive after startup, a laser output value optimal for the thus-changed temperature can be set, thereby enabling appropriate recording and reproducing operation.

DESCRIPTION OF THE PREFERRED EMBODIMENT

Figure 1:
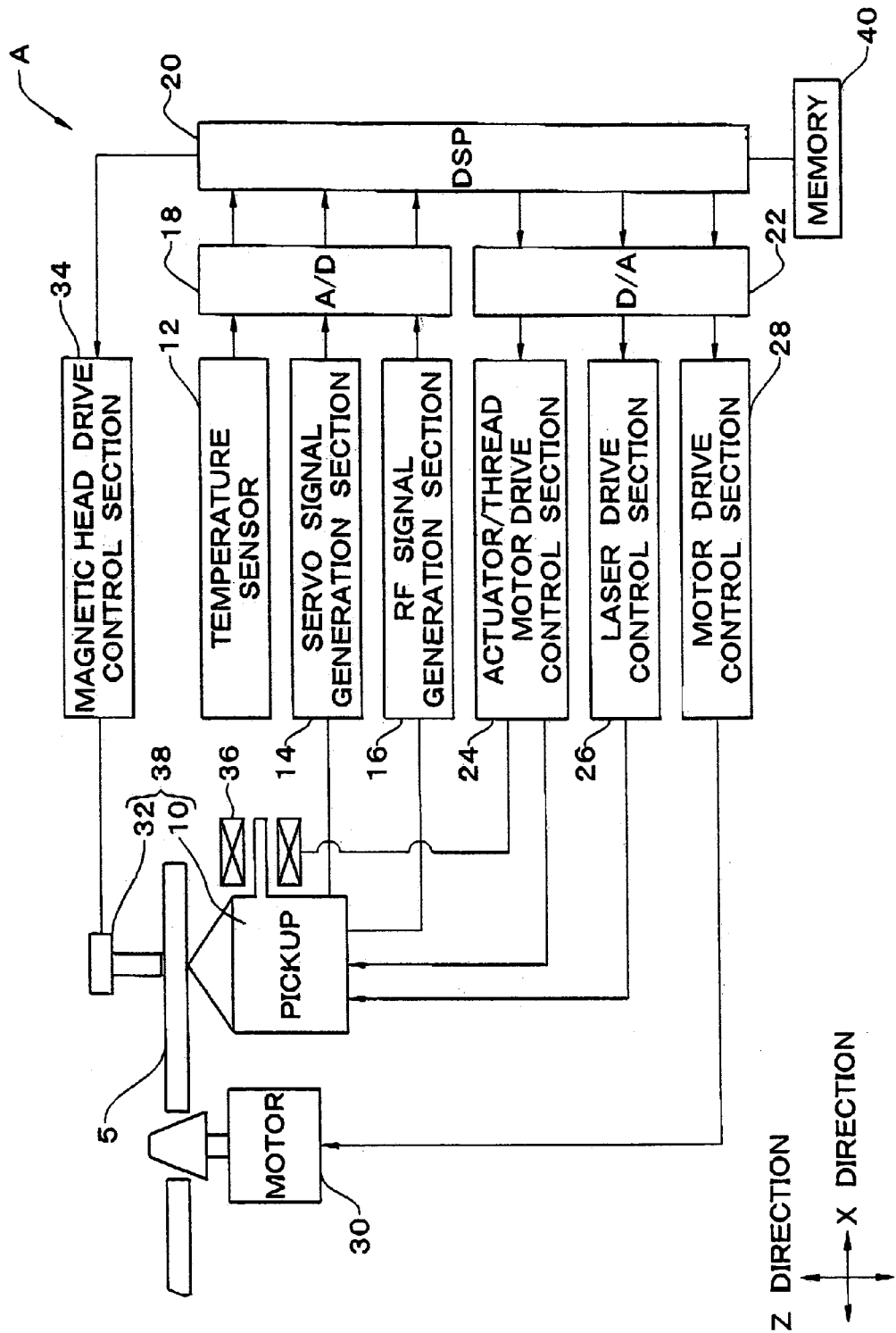
FIG. 1 is a block diagram showing the configuration of an optical disk drive according to an embodiment of the present invention.

A preferred embodiment of the present invention will be described hereinbelow by reference to the accompanying drawings. As shown in FIG. 1, an optical disk drive A according to the present invention comprises a pickup 10; a temperature sensor 12; a servo signal generation section 14; an RF signal generation section 16; an analog-to-digital (A/D) conversion section 18; a digital signal processor (DSP) 20; a digital-to-analog (D/A) conversion section 22; an actuator/thread motor drive control section 24; a laser drive control section 26; a motor drive control section 28; a motor 30; a magnetic head 32; a magnetic head drive control section 34; a thread motor 36; and memory 40.

Figure 2:
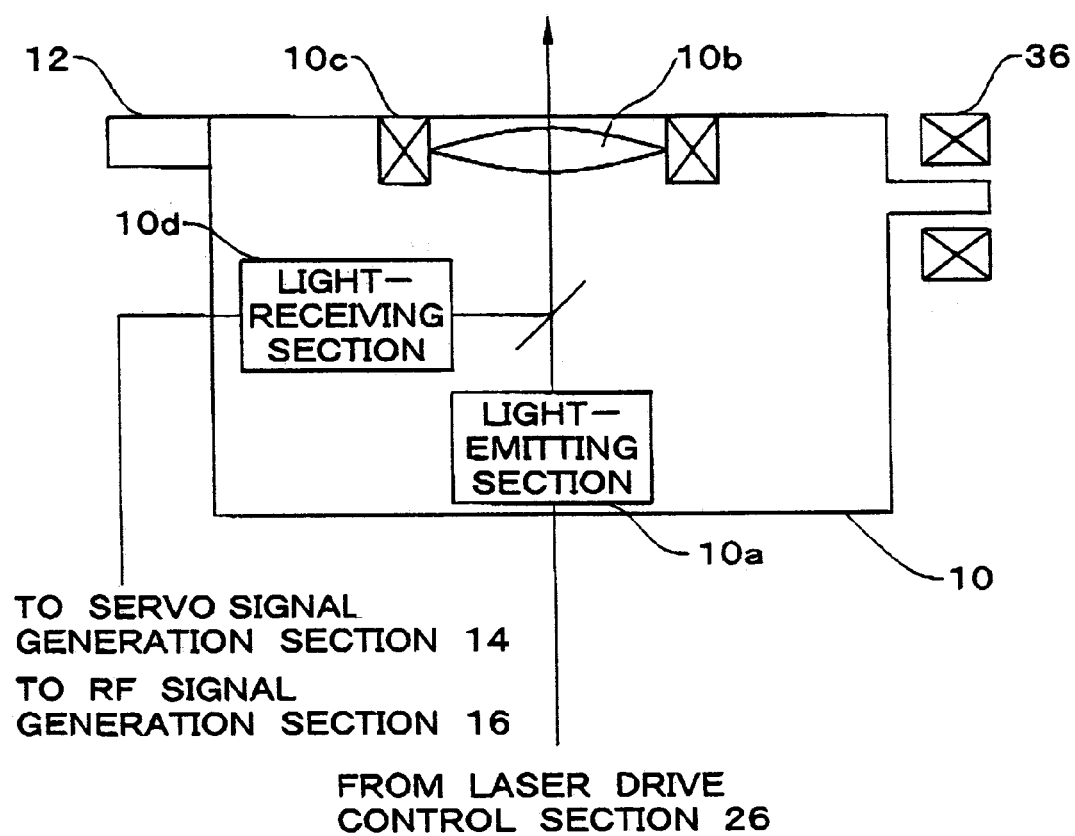
FIG. 2 is a block diagram showing the configuration of a pickup provided in the optical disk drive.

The pickup device 10 has the function of radiating laser onto a recording surface of a magneto-optical disk (hereinafter simply called a "disk") 5 and of receiving the laser reflected from the disk. As shown in FIG. 2, the pickup device 10 has a light-emitting section 10a, an objective lens 10b, an actuator 10c, and a light-receiving section 10d. Here, the light-emitting section 10a is a light-emitting element for radiating laser, and the objective lens 10b collects the laser originating from the light-emitting section 10a. The actuator 10c actuates the objective lens 10b in the radial and vertical directions on a disk; that is, X and Z directions (see FIGS. 1 and 2). During focus control operation, the actuator 10c is driven. The light-receiving section 10d is a light-receiving element for receiving the laser reflected from a recording surface of the disk 5. The pickup 10 acts as an optical head.

The temperature sensor 12 has the function of sensing a temperature and is mounted on an exterior side surface of the pickup 10.

The servo signal generation section 14 produces a servo signal from a reproduction signal output from the light-receiving section 10d of the pickup 10. The servo signal includes a focus error signal and a tracking error signal. The RF signal generation section 16 produces an RF signal from a reproduction signal output from the light-receiving section 10d of the pickup 10.

The DSP 20 is a controller for effecting various types of control operations; particularly, a temperature measurement operation (also called as a "temperature determination operation"), an offset adjustment, laser control operation, error detection operation, error correction operation, and gain control. Further, the DSP 20 also serves as an equalizer.

Figure 5:
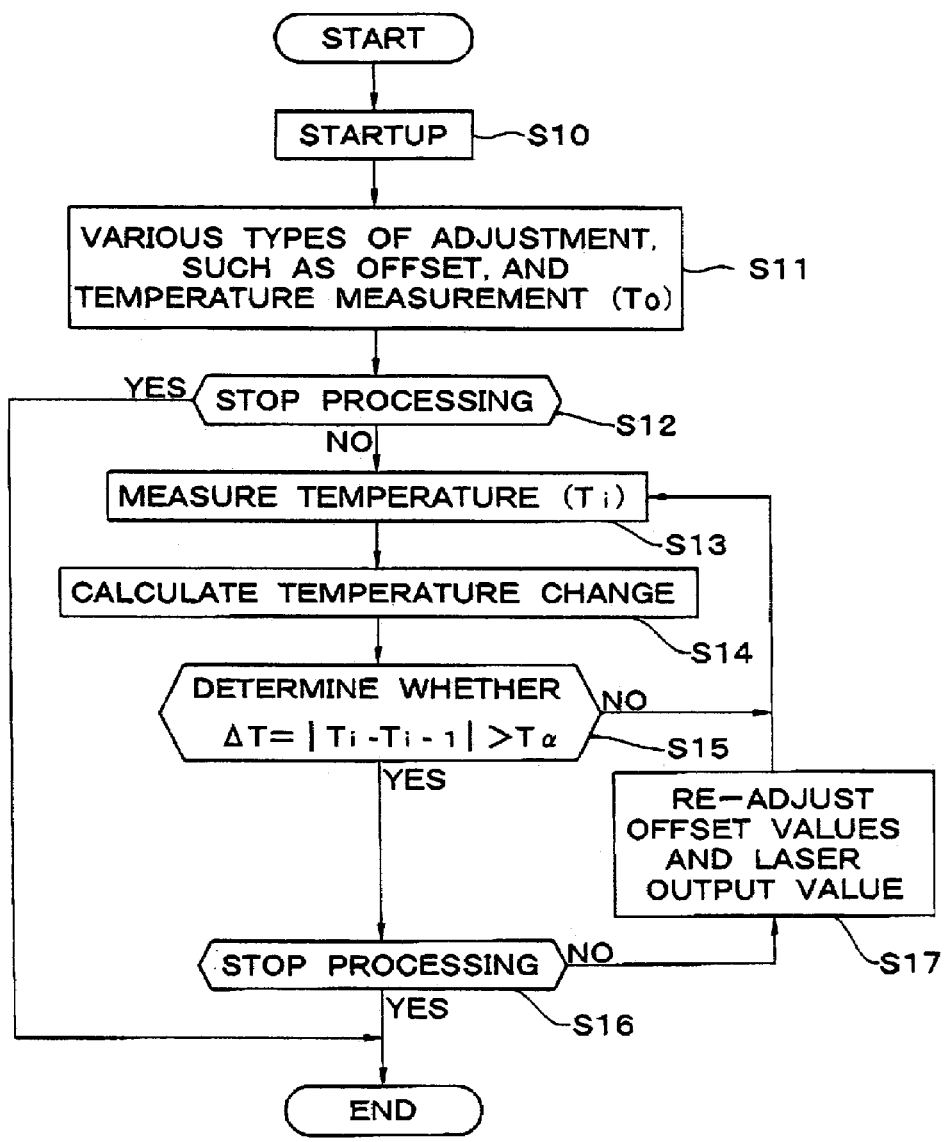
FIG. 5 is a flowchart showing operation of the optical disk drive according to the present embodiment.
Figure 6:
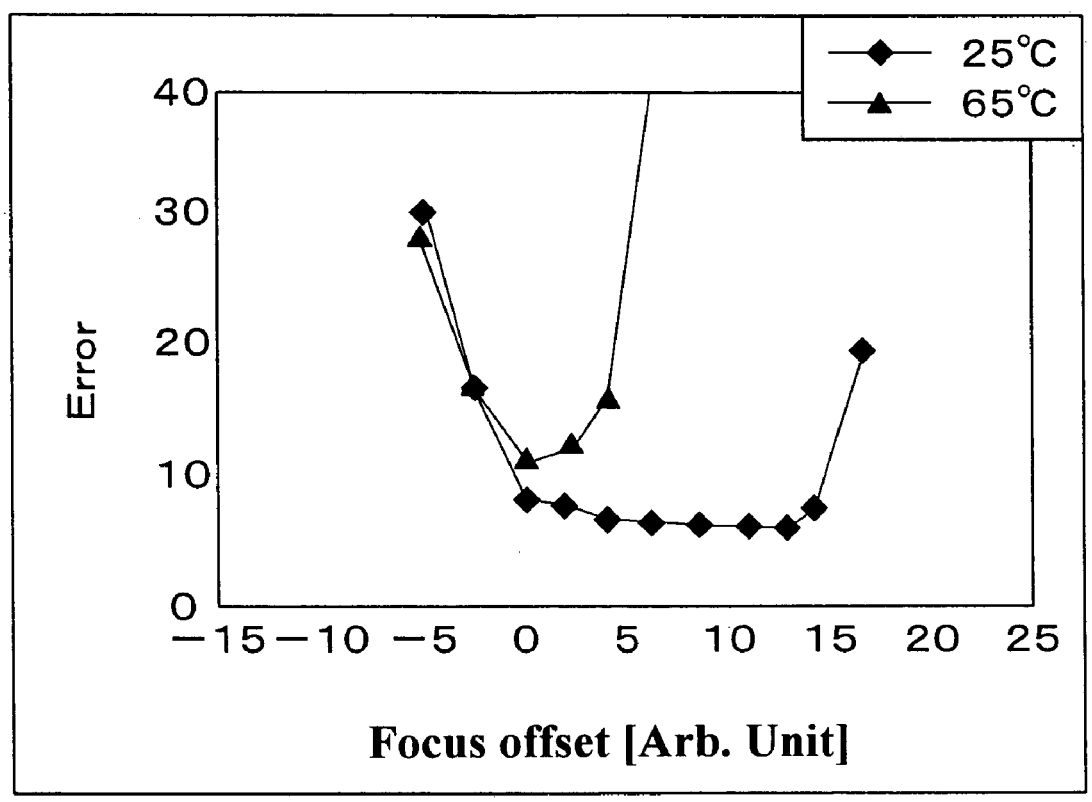
FIG. 6 is a descriptive view showing a relationship between a focus offset value and an error rate at different temperatures.
Figure 7:
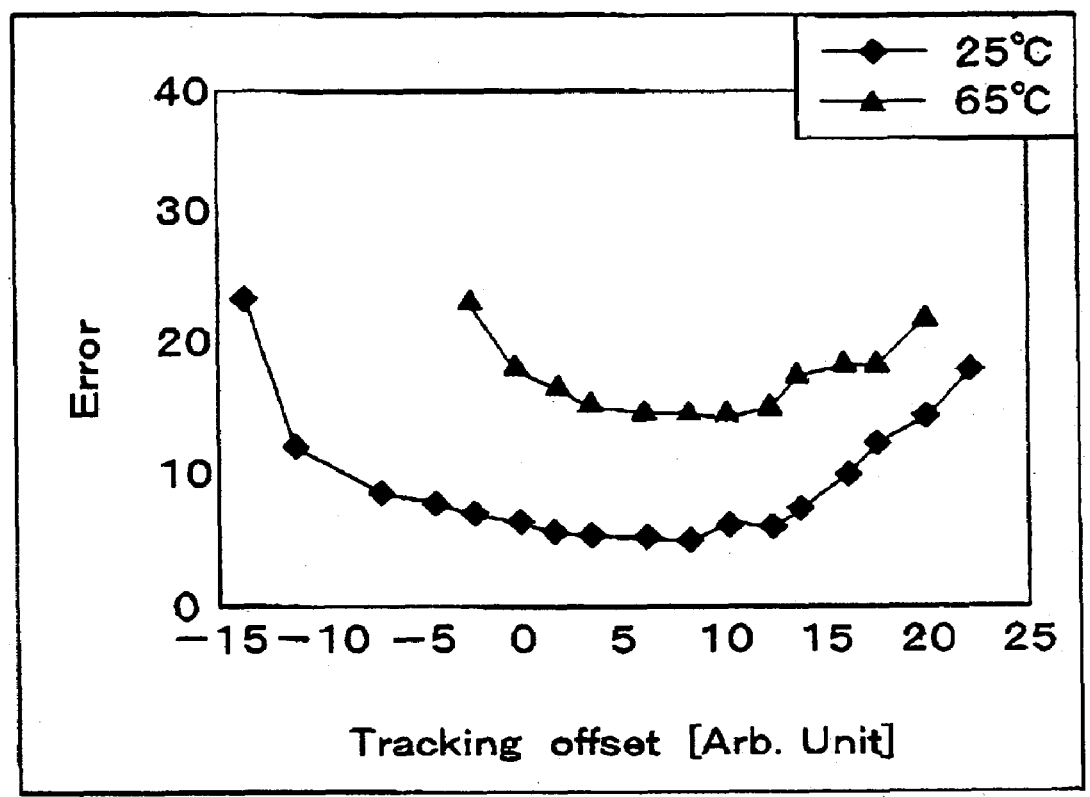
FIG. 7 is a descriptive view showing a relationship between a focus offset value and an error rate at different temperatures.

For example, the DSP 20 performs temperature measurement operation in accordance with information output from the temperature sensor 12. More specifically, the temperature sensor 12 and the DSP 20 act as the temperature measurement means. The DSP 20 performs offset control on the basis of a servo signal output from the servo signal generation section 14 and an RF signal output from the RF signal generation section 16. The DSP 20 controls a laser output value particularly on the basis of an RF signal output from the RF signal generation section 16. The DSP 20 performs offset adjustment and laser control operation in accordance with a flowchart shown in FIG. 5. Particularly when temperature variations have exceeded a predetermined value, the DSP 20 operates so as to again perform offset adjustment and adjustment of a laser output value. Detailed explanations thereof will be provided later. Further, the DSP 20 acts also as the controller.

Under control of the DSP 20, the actuator/thread motor drive control section 24 controls drive of the actuator 10c and that of the thread motor 36. Under control of the DSP 20, the laser drive control section 26 controls the value output from the light-emitting section 10a. Under control of the DSP 20, the motor drive control section 28 controls operation of the motor 30. The motor 30 is for rotating the disk 5.

The magnetic head 32 is used for magnetizing a recording surface of the disk 5; particularly, at the time of recording data on the disk 5. Under control of the DSP 20, the magnetic head drive control section 34 controls operation of the magnetic head 32.

The pickup 10 and the magnetic head 32 are integrated together, thus constituting the head 38.

The thread motor 36 is for actuating the head 38 from an inner radius to an outer radius of the disk in the radial direction of the disk 5 (i.e., an X direction shown in FIG. 1). The thread motor 36 is driven during seek and tracking control operations.

Figure 3:
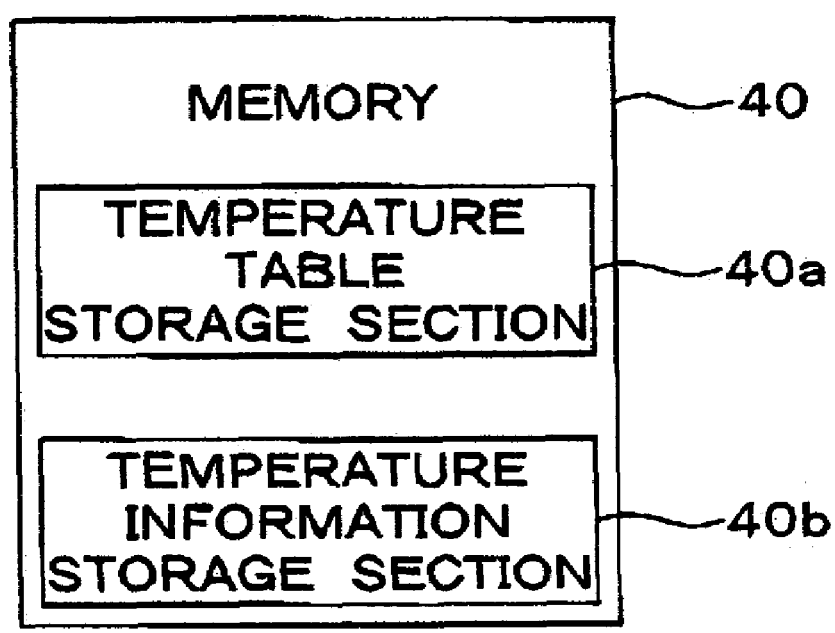
FIG. 3 is a descriptive view for describing the configuration of memory.
Figure 4:
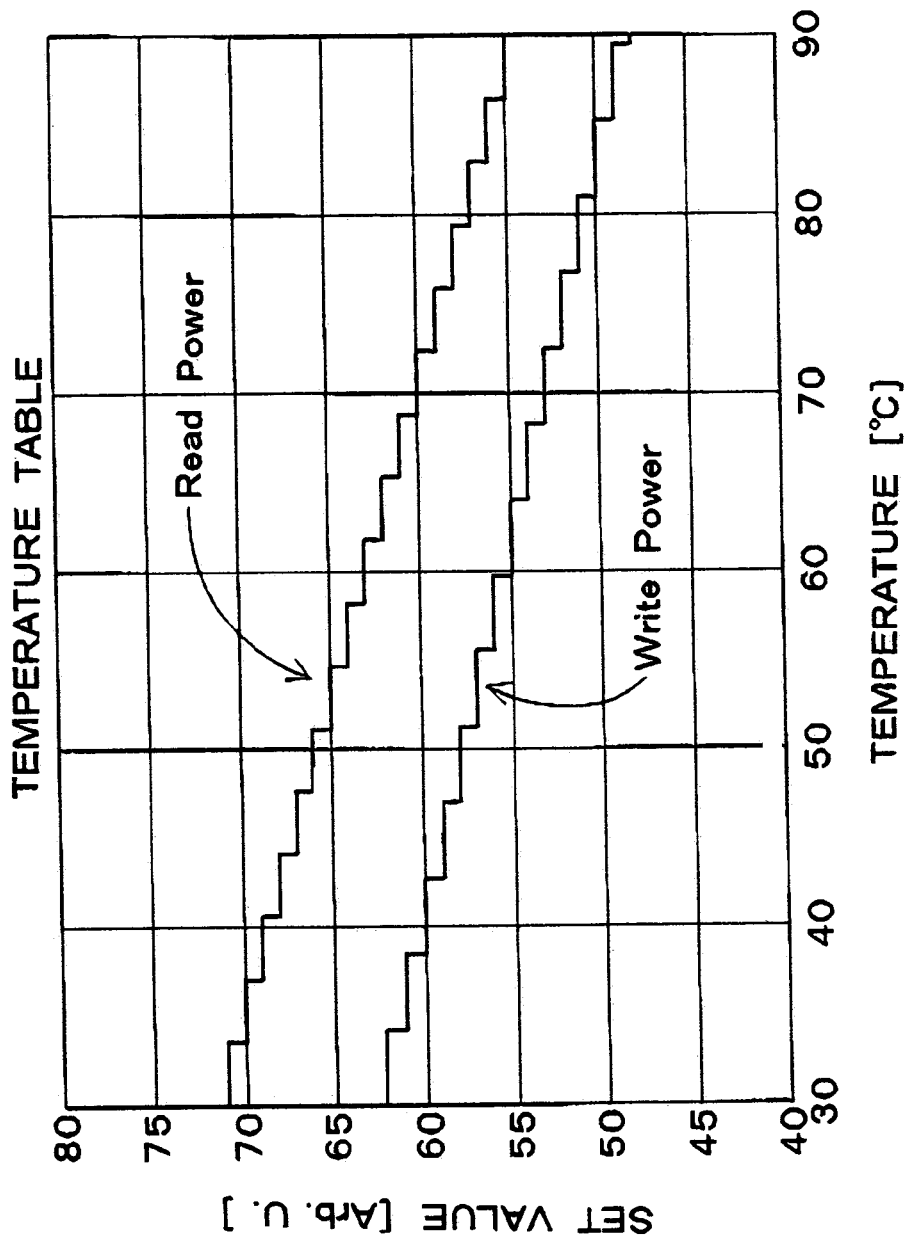
FIG. 4 is a descriptive view for describing a temperature table.

The memory 40 is for retaining various types of data sets. Particularly, as shown in FIG. 3, a temperature table storage section 40a and a temperature information storage section 40b are provided in the memory 40. Data pertaining to a temperature table (see FIG. 4) for controlling a laser output value are stored in the temperature table storage section 40a. As shown in FIG. 4, the temperature table shows a relationship between a temperature and a laser output value appearing at the time of recording operation and that appearing at the time of reproduction. The temperature table is used for re-adjustment of a laser output value, which will he described later. The temperature information storage section 40b is for storing information about measured temperatures. The memory 40 is also used for storing various types of offset-related data sets, such as set offset values.

Operation of the optical disk drive A having the foregoing configuration will now be described. First, the optical disk drive A is started up (S10). Startup of the optical disk drive A is effected by means of loading the disk 5 into the disk drive A.

When the optical disk drive A has been started up, various types of adjustment operations, such as offset adjustment operations, as well as temperature measurement, are performed (S11). In relation to offset adjustment, a focus offset and a tracking offset are adjusted. In relation to a focus offset, predetermined information is recorded and reproduced while a focus position is shifted by means of changing an offset value, thus searching an output level of an RF signal. An offset value at which the RF signal is maximized is set. In the case of a focus offset, there may also be a case where there is set an offset value at which a data error rate is minimized. In relation to a tracking offset, an offset value is set such that a tracking error signal obtained in an on-track state comes to the center of a tracking error signal obtained in an off-track state. In the case of a tracking offset, there may also be a case where predetermined information is recorded and reproduced while a focus position is shifted by means of changing an offset value, thus setting an offset value at which a data error rate is minimized. Setting of the offset values is performed by the DSP 20. In this case, the DSP 20 also acts as setting means for setting a focus offset value and/or a tracking offset value at startup of the optical disk drive. It can also be said that setting of a focus offset value and setting of a tracking offset value, both being performed in step S11, are performed at startup of the optical disk drive A. Information about the thus-set offset values is stored in the memory 40. In accordance with the thus-set offset values, the actuator/thread motor drive control section 24 performs position setting operations.

In addition to offset adjustment, setting of a laser output value (may also be called as "laser output" or "laser power value") is performed in step S11. In this case, recording and reproduction of predetermined information are performed while a laser output value is being changed, thus searching an error rate. The error rate is detected on the basis of an RF signal output from the RF signal generation section 16. There is set a laser output value at which an error rate is minimized. Setting of a laser output value is also performed by the DSP 20. In this case, the DSP 20 acts as the setting means for setting a laser output value of a light-emitting section, the laser being output from the light-emitting section for recording and/or reproducing data on and/or from an optical disk, at startup of the optical disk. It can be said that setting of a laser output value performed in step S11 is effected at startup of the optical disk drive A. Information about the thus-set laser output value is stored in the memory 40. Further, in accordance with the thus-set laser output value, the laser drive control section 26 sets a value of laser output from the light-emitting section 10a.

Further, temperature measurement is effected in step S11. Here, the DSP 20 performs the temperature measurement in accordance with the information output from the temperature sensor 12 and stores information about measured temperatures into the memory 40; more specifically, the temperature information storage section 40b. In this case, the temperature sensor 12 and the DSP 20 acts as the first temperature measurement means.

A determination is made as to whether or not stop processing has been performed within a predetermined period of time (S12). If so (when YES is selected in S12), processing is terminated. In contrast, if not (when NO is selected in S12), processing proceeds to step S13. The stop processing means releasing the optical disk drive A from a startup state in step S10. More specifically, when there has been performed an operation for unloading the disk 5 from the optical disk drive A, stop processing is deemed as having been performed. Here, determination operation to be performed in step S12 is performed by the DSP 20.

Temperature measurement is performed in step S13. On the basis of the information output from the temperature measurement operation. The temperature measuremenet operation to be performed in step S13 is cyclically performed at all times. Information about the thus-measured temperature is temporarily stored in the DSP 20. In this case, the temperature sensor 12 and the DSP 20 act as the second temperature measurement means.

The level of temperature variations is computed (S14). The level is computed by means of calculating a difference between a most-recently measured temperature and the immediately preceding temperature. Here, information about a temperature measured immediately before is stored in the DSP 20, and information about the temerature measured one measurement operation before the preceding temperature is stored in the memory 40. The DSP 20 reads temperature information from the memory 40 and compares the thus-read information with the temperature information retained in the DSP 20, thus determining a temperature difference. More specifically, provided that a most-recently measured temperature is taken as $T_1$ and that the immediately preceding temperature is taken as $T_{i-1}$, there is computed an absolute value of a difference $T_i$-$T_{i-1}$. For instance, the temperature measured in step S13 is taken as $T_2$. When the temperature measured immediately before $T_2$ is the temperature $T_1$ measured in step S11, a value of $T_2$-$T_1$ is computed.

A determination is made whether or not the thus-computed temperature difference exceeds a predetermined temperature difference (predetermined value) (S15). More specifically, when a predetermined temperature difference is taken as $T_\alpha$, the absolute value of a difference between $T_i$-$T_{i-1}$ is compared with $T_\alpha$. The DSP 20 performs the comparison operation. Here, the DSP 20 acts as determination means. The temperature difference Ta is set to a value at which an optimal offset value or laser output value is changed as a result of changes in temperature, thus interfering with reproduction. For example, a value of about 20° C. is considered as a value. If the computed temperature difference has exceeded the predetermined value (when YES is selected in S15), processing proceeds to step S16. In contrast, when the computed temperature difference has not exceeded the predetermined value, processing returns to step S13, where temperature measurement is again effected. If determination processing pertaining to step S15 has been completed, the DSP 20 stores the most recent temperature information stored in the DSP 20 into the temperature information storage section 40b of the memory 40. At this time, the temperature information that has already been stored in the temperature information storage section 40b is not necessary, and hence the most recent temperature information is written over the information.

In step S16, a determination is made as to whether or not stop processing has been performed, as in the case of processing pertaining to step S12. If stop processing has been performed (when YES is selected in step S16), processing is terminated. In contrast, when stop processing has not been performed (when NO is selected in step S16), processing proceeds to step S17. Here, the stop processing means releases the optical disk drive A from a startup state in step S10. More specifically, when there has been performed an operation for unloading the disk 5 from the optical disk drive A, stop processing is determined as having been performed. In step S16, the DSP 20 renders a determination.

In step S17, re-adjustment of an offset and re-adjustment of a laser output value are performed. A focus offset value and a tracking offset value are reset according to the same method as that employed in step S11. More specifically, an offset value at which the RF signal is maximized is set as a focus offset value while an output level of the RF signal is searched. Further, an offset value at which a tracking error signal obtained in an on-track state comes to the center of a tracking error signal obtained in an off-track state is taken as a tracking offset value. Optimum offset values are reset in accordance with a temperature determined through measurement. Here, the DSP 20 resets the offset values. The DSP 20 acts as the resetting means; that is, the offset value resetting means. Information about a newly-set offset value is stored in the memory 40. Further, in accordance with a set offset value, the actuator/thread motor drive control section 24 controls the actuator 10c and the thread motor 36, and the position of the objective lens 10b is set by the actuator 10c and the position of the head 38 is set by the thread motor.

During re-adjustment of the laser output value, an optimal laser output value is determined from the temperature table, and the thus-determined laser output value is set. As information about the most-recently measured temperature in step S13 is stored in the memory 40, the DSP 20 detects the laser output value corresponding to the temperature in accordance with the temperature table at the time of reproduction as well as at the time of recording, and the thus-detected laser output values are set. An optimal laser output value is reset by use of the measured temperature. More specifically, the DSP 20 acts as the reset means; that is, laser output value reset means. Information about a newly-set laser output value is stored in the memory 40. In accordance with the set laser output value, the laser drive control section 26 controls the light-emitting section 10a of the pickup 10. As a result, laser is output in accordance with a reset laser output value at the time of recording and reproduction operations.

When recording or reproduction operation is being performed when an attempt is made to effect processing pertaining to step S17, the recording or reproduction operation is prioritized. After completion of the recording or reproduction processing, processing pertaining to step S17 is performed. After completion of processing pertaining to step S17 processing returns to step S13, where temperature measurement is again effected.

As in the previous case, there is computed a difference between the currently-measured temperature and the immediately-preceding temperature (S14). When the temperature difference is greater than a predetermined value, the offset values and the laser output values are again adjusted (S15 through S17). When great temperature changes are determined through periodic temperature measurement, there is iterated an operation for resetting the offset values and the laser output value.

As mentioned above, the optical disk drive A according to the present embodiment resets offset values and the laser output value in accordance with changes in the internal temperature of the optical disk drive A. When great temperature changes are present, the focus offset value and the tracking offset value are reset. Further, the laser output value employed at the time of reproduction and that employed at the time of recording are reset. Hence, the offset values and the laser output value can be made optimal for a temperature that has changed, thereby enabling appropriate recording and reproduction operation.

The above description has mentioned that a difference between the most-recently measured temperature and the immediately preceding temperature is computed as computation of temperature changes to be effected in step S14. However, the present invention is not limited to this example. For example, there is computed a difference between the maximum temperature and the minimum temperature among a plurality of temperatures measured within a predetermined period of time (or when a predetermined number of temperature measurements have been performed). If the thus-computed temperature difference has exceeded a predetermined value, offset values and the laser output value may be readjusted as the level of temperature change has exceeded a predetermined level. More specifically, from among "n" (n is an integer of 3 or more) measured temperatures including the most-recently measured temperature, a difference between the maximum temperature and the minimum temperature is taken as a temperature change in step S14. In step S15, the temperature difference is compared with a predetermined value. If the temperature difference has exceeded the predetermined level, the offsets and the like are re-adjusted as the level of temperature change has exceeded a predetermined level.

As an alternative, the average value of temperature difference may be taken as a temperature change in step S14. In other words, a difference between a temperature measured in a certain measurement time and the temperature measured in a preceding measurement time is averaged, thereby computing a mean value of temperature difference. The thus-computed means value is taken as a temperature change in step S14. The mean value is compared with a predetermined value in step S15. If the mean value has exceeded the predetermined value, offset values and the laser output value may be re-adjusted as the level of temperature range has exceeded a predetermined level. More specifically, a difference between the most-recently measured temperature and the immediately-preceding temperature is computed (here the thus-computed difference is taken as a first temperature difference). Then, a difference between the immediately-preceding temperature and the temperature measured before the immediately-preceding temperature is computed (the thus-computed temperature difference is taken as a second temperature difference). A value which has been determined by means of averaging the first and second temperature differences is taken as temperature change in step S14.

The previous description has been made by means of taking an optical disk using a magneto-optic disk as an example. However, the present invention is not limited to such an example; there may also be employed an optical disk drive using another optical disk. More specifically, an optical disk drive of phase change type which is another example of a rewritable optical disk and an optical disk drive using a play-only disk may be employed. When the level of temperature change is greater than a predetermined level, the focus offset and tracking offset values are reset. Further, if the level of temperature change is greater than a predetermined level, the laser output value is reset.

Although it has been described that a temperature table is used for resetting the laser output value in step S17, the laser output value may be reset in the same manner as in step S11.

The invention Claimed is:

1. An optical disk drive comprising:
   setting means for setting a focus offset value and/or a tracking offset value at startup of the optical disk drive;
   first temperature measurement means for measuring an internal temperature of the optical disk drive at startup of the optical disk drive;
   second temperature measurement means for measuring an internal temperature the optical disk drive after startup of the optical disk drive;
   determination means for determining whether or not a difference between the temperature measured by the second temperature measurement means and the temperature measured by the first temperature measurement means has exceeded a predetermined level; and
   resetting means for resetting the focus offset value and/or the tracking offset value set by the setting means when the determination means determines that the difference has exceeded the predetermined level.

2. The optical disk drive according to claim 1, wherein the second temperature measurement means measures a temperature at predetermined times;
   the determination means determines whether or not a difference between a temperature most recently measured by the second temperature measurement means and an immediately preceding temperature measured by the second temperature measurement means has exceeded a predetermined level; and
   the resetting means resets a set focus offset value and/or a set tracking offset value when the determination means determines that the difference has exceeded the predetermined level.

3. An optical disk drive comprising:
   setting means for setting a laser output value of a light-emitting section, a laser being output from the light-emitting section for recording and/or reproducing data on and/or from an optical disk, at startup of the optical disk drive;
   first temperature measurement means for measuring an internal temperature of the optical disk drive at startup thereof;
   second temperature measurement means for measuring an internal temperature of the optical disk drive after startup thereof;
   determination means for determining whether or not a difference between the temperature measured by the second temperature measurement means and the temperature measured by the first temperature measurement means has exceeded a predetermined level; and
   resetting means for resetting the laser output value set by the setting means when the determination means determines that the difference has exceeded the predetermined level.

4. The optical disk drive according to claim 3, wherein the second temperature measurement means measures a temperature at a predetermined time;
   the determination means determines whether or not a difference between a temperature most recently measured by the second temperature measurement means and an immediately preceding temperature measured by the second temperature measurement means has exceeded a predetermined level; and
   the resetting means resets a set laser output value when the determination means determines that the difference has exceeded the predetermined level.

5. An optical disk drive, comprising:
   a temperature sensor for sensing an internal temperature of the optical disk drive; and
   a controller for setting a laser output value of a light-emitting section, a laser being output from the light-emitting section for recording and/or reproducing data on and/or from an optical disk, wherein
   the controller sets the laser output value at startup of the optical disk drive, determines whether or not a difference between a temperature measured by the temperature sensor at startup of the optical disk drive and a temperature measured by the temperature sensor after startup of the optical disk drive has exceeded a predetermined level, and resets the laser output value when the difference is determined to have exceeded the predetermined level.

6. The optical disk drive according to claim 5, wherein the controller measures the temperature detected by the temperature sensor at given times, determines whether or not a difference between a most-recently measured temperature and a measured temperature immediately preceding the most-recently measured temperature has exceeded a predetermined level, and resets a set laser output value when the difference is determined to have exceeded a predetermined value.

* * * * *